US010378584B2

(12) United States Patent
Yamashita

(10) Patent No.: US 10,378,584 B2
(45) Date of Patent: Aug. 13, 2019

(54) CAGE FOR RADIAL ROLLER BEARING

(71) Applicant: JTEKT CORPORATION, Osaka-shi, Osaka (JP)

(72) Inventor: Kotaro Yamashita, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/193,468

(22) Filed: Nov. 16, 2018

(65) Prior Publication Data

US 2019/0162234 A1 May 30, 2019

(30) Foreign Application Priority Data

Nov. 24, 2017 (JP) ................................ 2017-225915

(51) Int. Cl.
*F16C 33/46* (2006.01)
*F16C 19/26* (2006.01)

(52) U.S. Cl.
CPC .......... *F16C 33/4617* (2013.01); *F16C 19/26* (2013.01)

(58) Field of Classification Search
CPC ...... F16C 19/26; F16C 19/46; F16C 33/4611; F16C 33/4641; F16C 33/4647; F16C 33/4652
See application file for complete search history.

(56) References Cited

U.S. PATENT DOCUMENTS 4,435,024 A * 3/1984 Tagawa .................. F16C 19/26 384/576
5,116,146 A * 5/1992 Stenert .................... F16C 19/30 384/572

FOREIGN PATENT DOCUMENTS

DE 3322860 A1 * 1/1984 .......... F16C 33/4611
JP S50-56852 U 5/1975
JP 2009-92088 A 4/2009
JP 2011-99480 A 5/2011

* cited by examiner

*Primary Examiner* — Phillip A Johnson
(74) *Attorney, Agent, or Firm* — Oliff PLC

(57) ABSTRACT

A cage for a radial roller bearing includes an inner cage member made of a continuous annular steel material and having a plurality of through holes, in which a plurality of rollers is housed in a corresponding one of the through holes, and an outer cage member made from resin and having a plurality of retaining holes, in which the plurality of rollers is retained such that the rollers are rollable, provided in correspondence with the through holes. The outer cage member is fixed to an outer side of the inner cage member by an axial projection-recess fitting structure.

6 Claims, 5 Drawing Sheets

CAGE FOR RADIAL ROLLER BEARING

INCORPORATION BY REFERENCE

The disclosure of Japanese Patent Application No. 2017-225915 filed on Nov. 24, 2017 including the specification, drawings and abstract, is incorporated herein by reference in its entirety.

BACKGROUND OF THE INVENTION

1. Field of the Invention

The invention relates to a cage for a radial roller bearing.

2. Description of the Related Art

A radial roller bearing having a plurality of rollers has conventionally been used, for example, to support a rotor such that the rotor is rotatable relative to a support shaft. Such a radial roller bearing is typically configured such that a plurality of rollers is retained in retaining holes of a cylindrical cage. The plurality of rollers rolls between an inner circumferential surface of the rotor and an outer circumferential surface of the support shaft (see, for example, Japanese Patent Application Publication No. 2011-99480 (JP 2011-99480 A), Japanese Patent Application Publication No. 2009-92088 (JP 2009-92088 A), or Japanese Utility Model Application Publication No. 50-56852 (JP 50-56852 U)).

A radial roller bearing described in JP 2011-99480 A or JP 2009-92088 A is used as, for example, a bearing that supports a planet gear in a planetary gear. A plurality of rollers disposed between an inner circumferential surface of the planet gear, which serves as a rotor, and an outer circumferential surface of a support shaft is retained in a cylindrical cage. A cage for a radial roller bearing described in JP 2011-99480 A is made of steel sheet. A cage for a radial roller bearing described in JP 2009-92088 A is made from resin.

A cage described in JP 50-56852 U is used mainly for light load purposes and includes an iron cage body and a pair of annular cage covers made from synthetic resin. The cage body is obtained by forming a strip-shaped steel sheet, in which a plurality of windows for retaining rollers is provided, into a cylindrical shape without applying resistance welding. One of the cage covers is fixed to one axial end of the cage body, whereas the other of the cage covers is fixed to the other axial end of the cage body.

A radial roller bearing may be used as, for example, a bearing of a planet gear disposed between a sun gear and an annulus gear. In such a case, the planet gear revolves together with a carrier while rotating. Accordingly, a large load will be placed on a cage of the radial roller bearing, particularly when the planet gear rotates or revolves at a high speed. A centrifugal force developed by the revolving can make the cage eccentric relative to a support shaft and may cause the cage and the planet gear to rotate relative to each other while making a sliding contact between an outer circumferential surface of the cage and an inner circumferential surface of the planet gear. In such a case, when the cage is made of steel, friction between the outer circumferential surface of the cage and the inner circumferential surface of the planet gear may develop rotational resistance and frictional heat.

When the cage is made from synthetic resin, it is difficult to secure sufficient strength of the cage. The cage can thus be deformed under a centrifugal force and become unable to retain rollers appropriately. Similarly, the cage described in JP 50-56852 U can be deformed under a centrifugal force such that a clearance between opposite longitudinal ends of the strip-shaped steel sheet expands, and may become unable to retain rollers appropriately.

SUMMARY OF THE INVENTION

It is an object of the invention to provide a cage for a radial roller bearing capable of reducing rotational resistance and frictional heat developed by friction against an inner circumferential surface of a rotor while securing sufficient strength.

According to an aspect of the invention, a cage for a radial roller bearing includes an inner cage member made of an annular steel material and having a plurality of through holes, in which a plurality of rollers is housed in a corresponding one of the through holes, and an outer cage member made from resin and having a plurality of retaining holes, in which the plurality of rollers is retained such that the rollers are rollable, provided in correspondence with the through holes. The outer cage member is fixed to the inner cage member by an axial projection-recess fitting structure.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments and modifications of the invention will be described below with reference to FIG. 1 to FIG. 7. The embodiments described below are given as preferred specific examples for carrying out the invention and may specifically illustrate various technically-preferable technical matters. However, it should be understood that the scope of the invention is not limited to the specific aspects.

Figure 1:
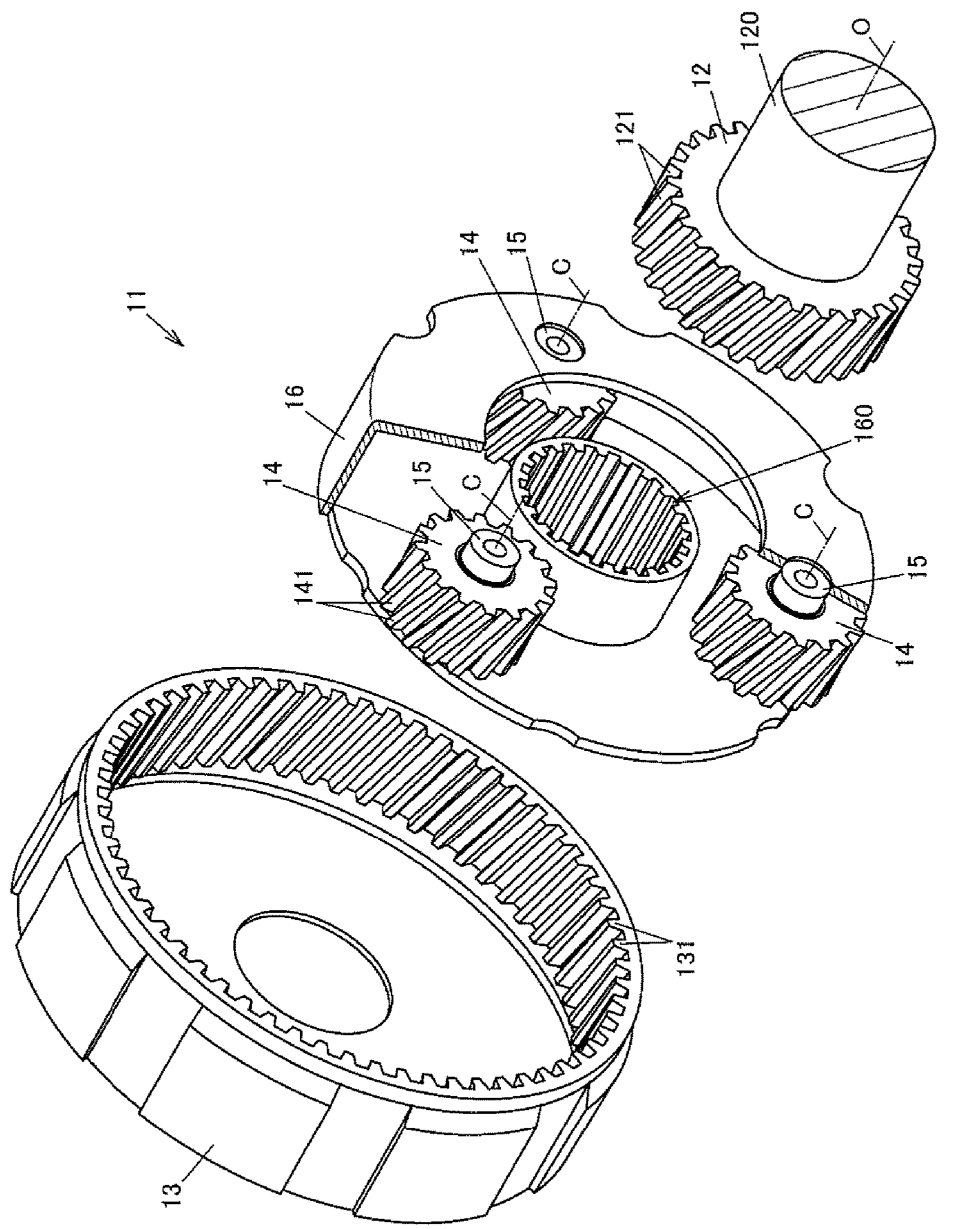
FIG. 1 is an exploded perspective view illustrating a planetary gear that uses radial roller bearings according to an embodiment of the invention.
Figure 2A:
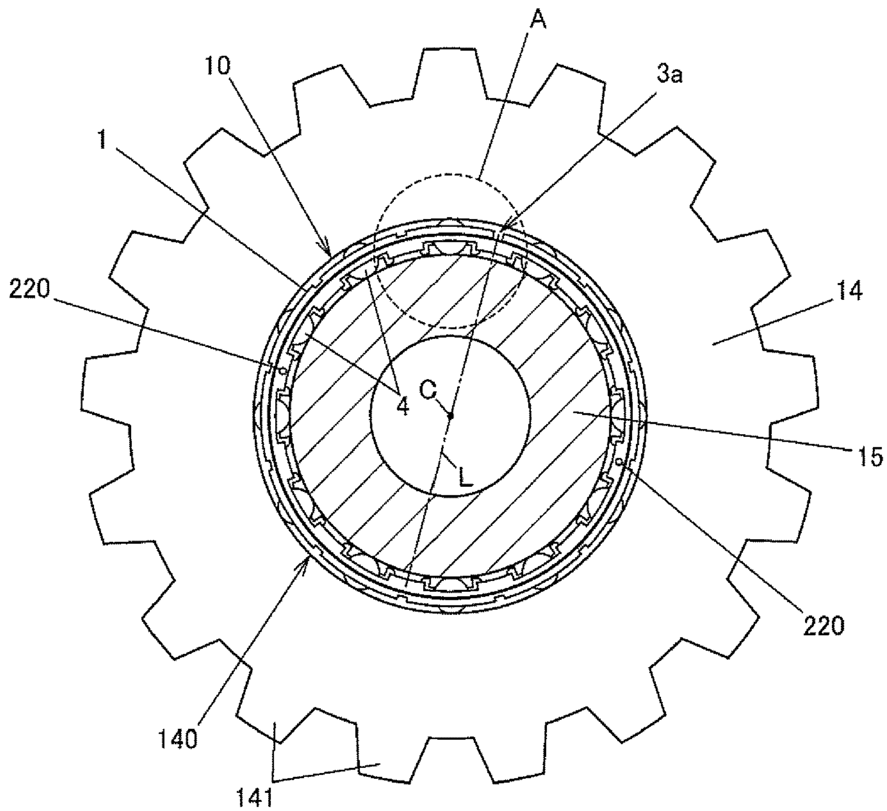
FIG. 2A is an overall side view of the radial roller bearing disposed between a planet gear and a support shaft as viewed along an axial direction.
Figure 2B:
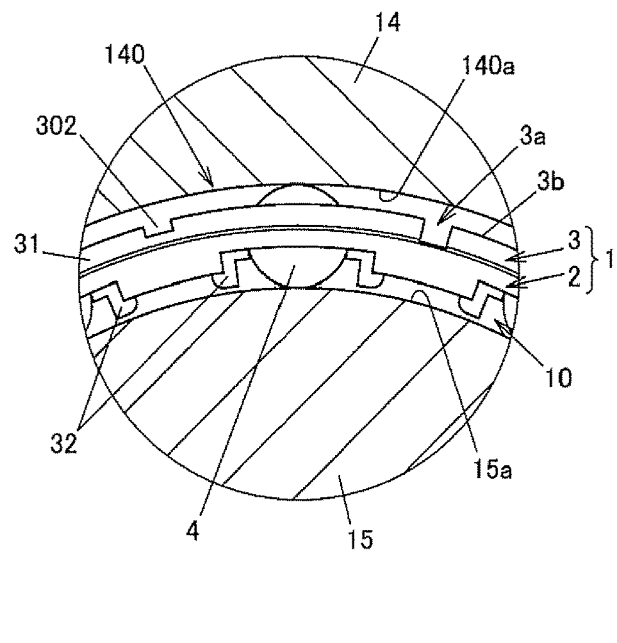
FIG. 2B is an enlarged view of portion A of FIG. 2A.

FIG. 1 is an exploded perspective view illustrating a planetary gear that uses radial roller bearings according to an embodiment of the invention. FIG. 2A is an overall side view of the radial roller bearing disposed between a planet gear and a support shaft as viewed in an axial direction. FIG. 2B is an enlarged view of portion A of FIG. 2A.

A planetary gear 11 includes a sun gear 12, an annulus gear 13, a plurality of (in the present embodiment, three) planet gears 14, support shafts 15, and a carrier 16. The sun gear 12 includes external gear teeth 121 on an outer circumferential surface thereof. The annulus gear 13 includes internal gear teeth 131 on an inner circumferential surface thereof. The planet gears 14, which are disposed between the sun gear 12 and the annulus gear 13, mesh with the external gear teeth 121 and the internal gear teeth 131. Each of the support shafts 15 is inserted into a corresponding one of the planet gears 14. The support shafts 15 are fixed to the carrier 16.

The planetary gear 11 is used in, for example, a transmission that changes a rotational speed of an output shaft (crankshaft) of an engine, which is a power source for an automobile. In the planetary gear 11, one of three elements, which are the sun gear 12, the annulus gear 13, and the carrier 16, is fixed and a torque is input to another one of the elements. Hence, the input torque is transmitted to the remaining one of the elements with rotational speed reduced or increased. Sliding of each part of the planetary gear 11 is lubricated with lubricating oil (transmission oil).

The sun gear 12 includes a shaft 120, which is fixed to a center portion of the sun gear 12 so as not to be rotatable relative to the sun gear 12, and is disposed coaxially with the annulus gear 13 and the carrier 16. The planet gear 14 has, through its center portion, an axial hole 140, into which the support shaft 15 is inserted. A radial roller bearing 10 according to the present embodiment is disposed between an outer circumferential surface 15*a* of the support shaft 15 and an inner circumferential surface 140*a* of the axial hole 140 of the planet gear 14 to smooth rotation of the planet gear 14 relative to the support shaft 15.

When, for example, the shaft 120 rotates relative to the annulus gear 13 that is fixed, rotation of the sun gear 12 rotating with the shaft 120 is reduced in speed and output to an output shaft (not illustrated) that is spline-fitted in a center hole 160 of the carrier 16. The planet gear 14 revolves about a rotation axis O of the shaft 120 and simultaneously rotates about a central axis C of the support shaft 15.

The radial roller bearing 10 includes a cage 1, which includes an inner cage member 2 and an outer cage member 3, and a plurality of cylindrical rollers 4. The radial roller bearing 10 supports rotation of the planet gear 14 while receiving a centrifugal force developed by revolving of the planet gear 14. In the present embodiment, uniformly-spaced 12 rollers, which are the rollers 4, are retained in the cage 1. Hereinafter, the direction parallel to the central axis C of the support shaft 15 is referred to as the axial direction. In the following description, "inner" and "outer" denote the inner side and the outer side in a radial direction about the central axis C.

Figure 3:
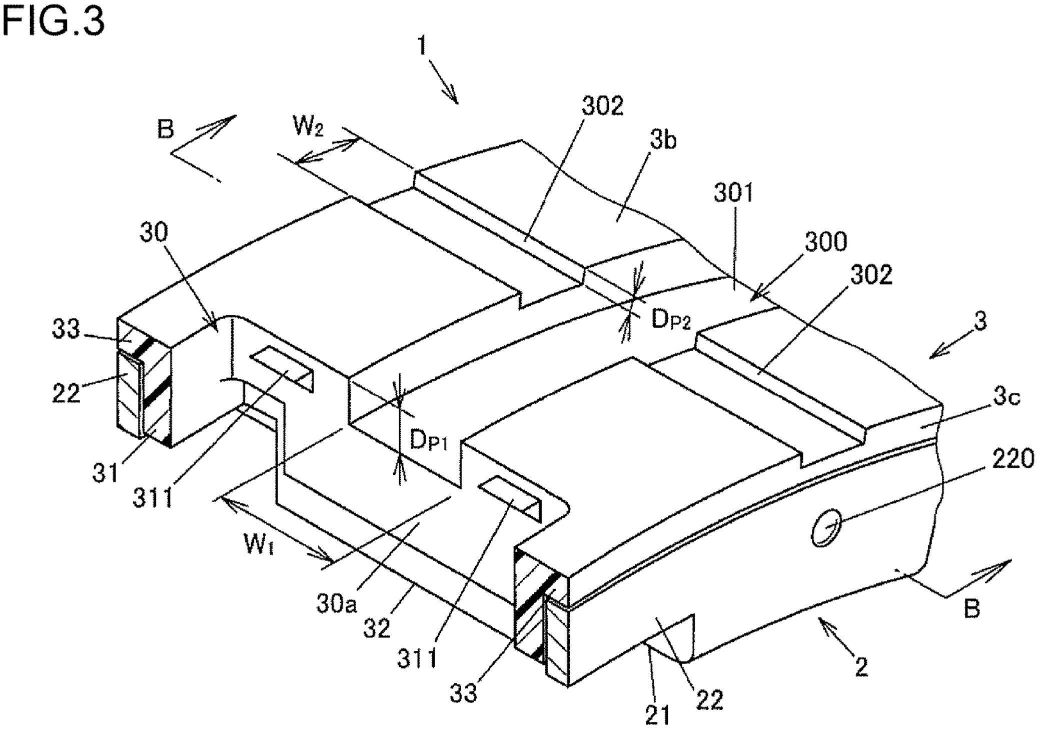
FIG. 3 is a perspective sectional view of a part of a cage taken at one circumferential position.
Figure 4:
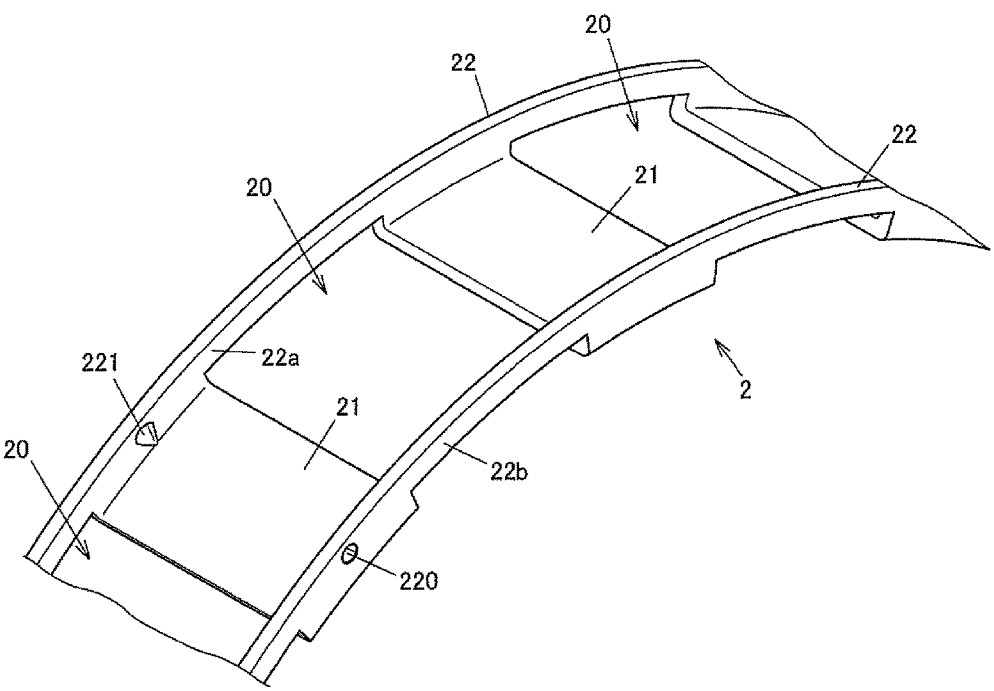
FIG. 4 is a perspective view illustrating an inner cage member.
Figure 5:
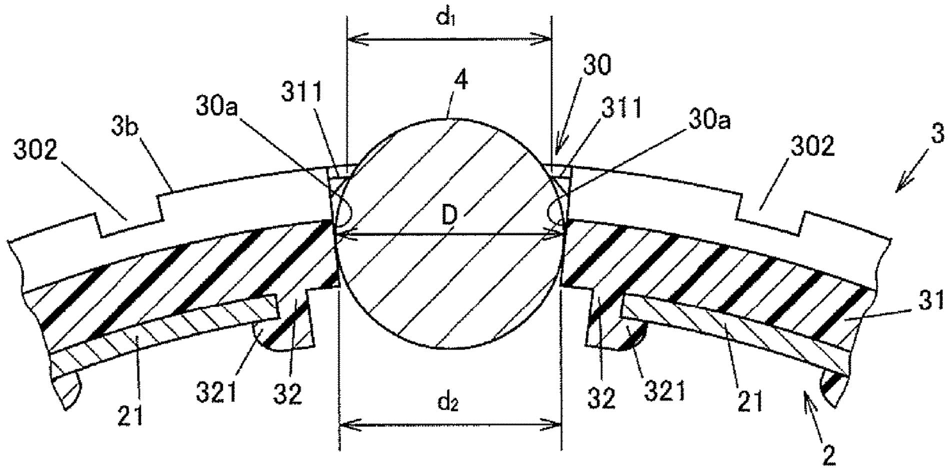
FIG. 5 is a circumferential sectional view illustrating a part of the radial roller bearing.
Figure 6:
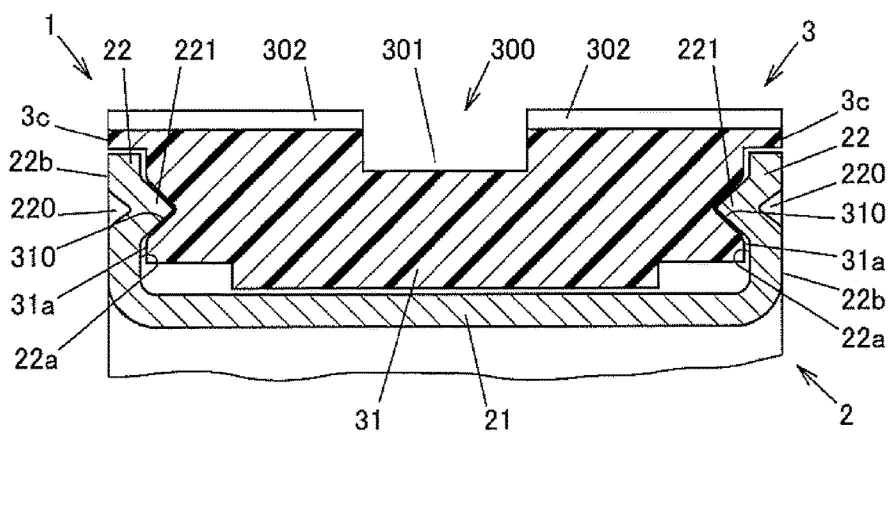
FIG. 6 is a sectional view taken along line B-B of FIG. 3.

FIG. 3 is a perspective sectional view of a part of the cage 1 taken at one circumferential position. FIG. 4 is a perspective view illustrating the inner cage member 2. FIG. 5 is a circumferential sectional view of a part of the radial roller bearing 10. FIG. 6 is a sectional view taken along line B-B of FIG. 3.

The inner cage member 2 is made of a continuous annular steel material and has a plurality of through holes 20. One roller 4 is housed in each through hole 20. A ferrous metal, such as low-carbon steel, can preferably be used as the steel material. The inner cage member 2 includes a plurality of cage bars 21 and a pair of side panel portions 22. The cage bars 21 extend axially and define the through holes 20. The side panel portions 22 are coupled by the cage bars 21 and axially face each other from the outer sides of the cage bars 21. The side panel portions 22 are radially outwardly bent at a right angle with respect to the longitudinal direction of the cage bars 21 to face each other and be parallel to each other. The through holes 20 are provided in an area between and including the pair of side panel portions 22 and make a part of inner portions of the side panel portions 22 axially open.

The inner cage member 2 can be manufactured as follows, for example. A steel sheet is punched into a strip having openings that serve as the through holes 20. The punched member is bent into an annular shape. Opposite longitudinal ends of the member are joined by welding. Furthermore, opposite end portions of the member in the width direction are radially outwardly bent. Alternatively, the inner cage member 2, which is continuous, can be obtained by forging steel material into a ring shape and applying machine-cutting to the ring-shaped steels. The term "continuous" means being continuous as a whole in the circumferential direction rather than being separated at one or more circumferential positions as in, for example, a C-ring.

The outer cage member 3 is made of an injection-molded resin. A plurality of retaining holes 30, in which the plurality of rollers 4 is retained such that the rollers are rollable, is provided in correspondence with the through holes 20 of the inner cage member 2. Synthetic resin, such as nylon 66, nylon 46, or polyphenylene sulfide resin (PPS), can preferably be used as the resin. The outer cage member 3 is annular and has a split 3*a* (see FIGS. 2A and 2B) at one circumferential position. The outer cage member 3 is attached to the inner cage member 2 as follows. The outer cage member 3 is elastically deformed by pressing opposite ends of the outer cage member 3 facing across the split 3*a* so as to extend the split 3*a*. The outer cage member 3 is placed on the outer side of the inner cage member 2.

The outer cage member 3 integrally includes a body portion 31 and a plurality of locking portions 32. The body portion 31 covers the plurality of cage bars 21 of the inner cage member 2 from the outer side. The locking portions 32 radially inwardly project from the body portion 31 to fit in the through holes 20 of the inner cage member 2 to be hooked to the cage bar 21. The body portion 31, which is at least partly placed between the pair of side panel portions 22, includes, on an internal surface 30*a* of each of the retaining holes 30, a pair of protrusions 311 that prevents disengagement of the roller 4. As illustrated in FIG. 5, a clearance $d_1$ between the protrusions 311, which face each other across the roller 4, on the internal surface 30*a* and a clearance $d_2$ between inner ends of the internal surface 30*a* are smaller than a diameter D of the roller 4.

The locking portion 32 includes, at its distal end, a hook portion 321. The hook portion 321 engages with the cage bar 21. An axial length of the locking portion 32 is shorter than an axial length of the cage bar 21, and the hook portion 321 engages with a part, in the axial direction, of the cage bar 21. A clearance between a pair of the locking portions 32 facing each other across the retaining hole 30 is larger than the clearance $d_2$ between the inner ends of the internal surface 30*a* of the retaining hole 30. The outer cage member 3 is thus configured such that the locking portions 32 do not interfere with the roller 4 when the body portion 31 is elastically deformed to fit the roller 4 in the retaining hole 30 from the inner side of the cage 1.

In the present embodiment, a radially outer part of the body portion 31 projects in the radial direction toward an outer periphery from an area between the pair of side panel portions 22. A pair of hood portions 33 (see FIG. 3) that covers outer sides of the pair of side panel portions 22 is formed integrally with the body portion 31 such that the hood portions 33 project in the axial direction from opposite radial ends of the projecting part of the body portion 31. An outer circumferential surface 3*b* of the outer cage member 3 faces the inner circumferential surface 140*a* of the axial hole 140 of the planet gear 14 across the body portion 31 and the pair of hood portions 33.

The outer circumferential surface 3*b* of the outer cage member 3 has a lubrication groove 300 that communicates with the retaining holes 30 to allow lubricating oil to flow. The lubrication groove 300 has a circumferential groove portion 301 and an axial groove portion 302. The circumferential groove portion 301 extends in the circumferential direction to communicate with the retaining holes 30. The axial groove portion 302 communicates with the circumferential groove portion 301 and extends to axial end faces 3*c* of the outer cage member 3. The circumferential groove portion 301, which is provided in an axial center portion of the body portion 31, extends across an area between two of the retaining holes 30 adjacent in the circumferential direction. The axial groove portion 302 is provided in a portion corresponding to outside of the cage bar 21 of the inner cage member 2 such that the axial groove portion 302 traverses the outer circumferential surface 3*b* of the outer cage member 3 along the axial direction.

In the present embodiment, as illustrated in FIG. 3, a groove width $W_1$ of the circumferential groove portion 301 is greater than a groove width $W_2$ of the axial groove portion 302; and a groove depth $D_{P1}$ of the circumferential groove portion 301 is greater than a groove depth $D_{P2}$ of the axial groove portion 302. One or both of the groove width relationship and the groove depth relationship may be reversed, and one or both of the groove width pair and the groove depth pair may be identical. However, it is desirable that $W_1>W_2$ and $D_{P1}>D_{P2}$ hold as described above to reduce radial deformation of the outer cage member 3 and supply a sufficient amount of lubricating oil to the outer circumferential surface 3*b* when a centrifugal force is exerted on the outer cage member 3.

The outer cage member 3 is fixed to the inner cage member 2 by an axial projection-recess fitting structure. More specifically, a projection formed on any one of a facing face 22*a,* which faces the body portion 31 of the outer cage member 3, of one of the side panel portions 22 of the inner cage member 2 and a facing face 31*a,* which faces the one of the side panel portions 22, of the body portion 31 fits in a recess provided in the other facing face. The outer cage member 3 is thus fixed to the inner cage member 2. In the present embodiment, projections 221 are formed on the facing faces 22*a* of the side panel portions 22 of the inner cage member 2. The projections 221 fit in recesses 310 provided in the facing faces 31*a* of the body portion 31 of the outer cage member 3. As illustrated in FIG. 4, the projections 221 are conical, for example. However, a shape of the projections 221 is not limited to this. Alternatively, the projections 221 may be cylindrical, prismatic, or hemispherical.

The projection 221 may be formed by placing a punch-like tool on an external surface 22*b* (on the side opposite from the facing face 22*a*) of the side panel portion 22 and pressing the tool in the axial direction. A conical recess 220 is made at a portion on the side opposite from the projection 221 where the tool is placed. The recess 310 in the outer cage member 3 may be made during injection molding or may alternatively be made by, for example, cutting after molding of the body portion 31. The recess 310 has a shape conforming to the projection 221. In the present embodiment, the recess 310 has a conical shape.

The projections 221 are formed, at least one on each side, on both sides of a straight line L extending through the split 3*a* and the central axis C in the axial view of the cage 1 illustrated in FIG. 2A. In the present embodiment, the projections 221 are formed at opposite ends of the cage 1 on a line extending through the central axis C perpendicularly to the straight line L. FIG. 2A illustrates the recesses 220 corresponding to the projections 221. In addition to the projections 221, another projection 221 may be formed near the split 3*a.*

As illustrated in FIG. 6, the projections 221 are formed on the side panel portions 22 of the inner cage member 2 at positions where the projections 221 face each other in the axial direction across the cage bar 21. The outer cage member 3 is fixed to the inner cage member 2 as follows. The inner cage member 2 is elastically deformed to extend the clearance between the side panel portions 22. The body portion 31 of the outer cage member 3 is pressed into the clearance between the pair of side panel portions 22 to fit the projections 221 in the recesses 310.

Figure 7:
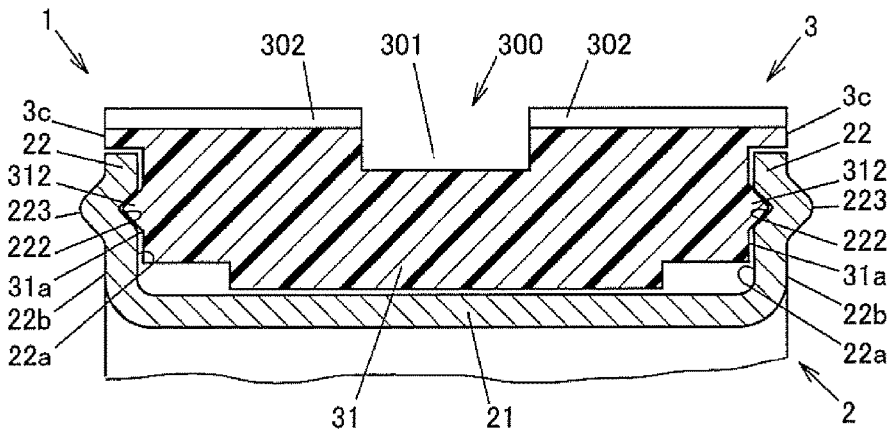
FIG. 7 is a sectional view illustrating a modification of a projection-recess fitting structure of the inner cage member and an outer cage member.

FIG. 7 is a sectional view illustrating a modification of the projection-recess fitting structure of the inner cage member 2 and the outer cage member 3. In this modification, projections 312 are formed on the facing faces 31*a* of the body portion 31 of the outer cage member 3, and recesses 222 are provided in the facing faces 22*a* of the side panel portions 22 of the inner cage member 2. The projections 312 of the outer cage member 3 fit in the recesses 222 of the inner cage member 2. Bulges 223 are formed on the external surfaces 22*b* of the side panel portions 22 at positions opposite from the recesses 222.

According to the embodiments and modification described above, the inner cage member 2 made of steel is placed on the inner side of the outer cage member 3. This enhances the strength of the cage 1, reducing the deformation amount of the cage 1 even when a centrifugal force is exerted. The outer cage member 3 is made from resin and the lubrication groove 300 is provided in the outer circumferential surface 3*b*. Accordingly, rotational resistance and frictional heat developed by friction can be reduced even when the cage 1 becomes eccentric and the outer circumferential surface 3*b* of the outer cage member 3 is brought into contact with the inner circumferential surface 140*a* of the axial hole 140 of the planet gear 14. Furthermore, lubricating oil is supplied also to the axial end faces 3*c* because the axial groove portion 302 of the lubrication groove 300 extends to the axial end faces 3*c* of the outer cage member 3. Hence, rotational resistance and frictional heat developed by friction against the carrier 16 can also be reduced.

Although the invention has been described according to the embodiments, it is to be understood that the embodiments do not limit the scope of the claims of the invention. It should be noted that not all of the combinations of the features described in the embodiments are necessary in solving the problem to be solved by the invention.

It is to be understood that various modifications can be made in the invention without departing from the spirit thereof. For example, in the description of the embodiment given above, the locking portions 32 of the outer cage member 3 are hooked to the opposite circumferential end portions of all of the cage bars 21. However, applicable configurations are not limited thereto. The locking portion 32 may be hooked to at least one end portion on at least one circumferential side of at least one of the cage bars 21.

In the description of the embodiment given above, the radial roller bearing 10 is used to support the planet gears 14 of the planetary gear 11 against the support shaft 15. However, applications are not limited thereto. The radial roller bearing 10 can be used for various purposes.

A cage for a radial roller bearing according to an aspect of the invention is capable of reducing rotational resistance and frictional heat developed by friction against an inner circumferential surface of a rotor while securing sufficient strength.

What is claimed is:

1. A cage for a radial roller bearing, the cage comprising:
an inner cage member made of an annular steel material and having a plurality of through holes, in which a plurality of rollers is housed in a corresponding one of the through holes; and
an outer cage member made from resin and having a plurality of retaining holes, in which the plurality of rollers is retained such that the rollers are rollable, provided in correspondence with the through holes, wherein
the outer cage member is fixed to the inner cage member by an axial projection-recess fitting structure.

2. The cage according to claim 1, wherein
the inner cage member includes
a plurality of cage bars extending in an axial direction and defining the through holes, and
a pair of side panel portions coupled by the cage bars and facing each other in the axial direction,
the outer cage member includes a body portion covering the plurality of cage bars from radially outside and at least partly disposed between the pair of side panel portions, and
the projection-recess fitting structure is configured such that a projection formed on any one of a first facing face, the first facing face facing the body portion, of one of the side panel portions and a second facing face, the second facing face facing the one of the side panel portions, of the body portion fits in a recess provided in the other one of the first and second facing faces.

3. The cage according to claim 2, wherein the outer cage member has a lubrication groove communicating with the retaining holes to allow lubricating oil to flow.

4. The cage according to claim 3, wherein the lubrication groove has a circumferential groove portion extending in a circumferential direction to communicate with the retaining holes and an axial groove portion communicating with the circumferential groove portion and extending to an axial end face of the outer cage member.

5. The cage according to claim 2, wherein the outer cage member includes a locking portion, the locking portion radially inwardly projecting from the body portion to fit into one of the through holes to be hooked to a corresponding one of the cage bars.

6. The cage according to claim 1, wherein the outer cage member is annular and has a split at one circumferential position.

* * * * *